(12) United States Patent
Nguyen

(10) Patent No.: US 9,450,633 B1
(45) Date of Patent: Sep. 20, 2016

(54) MOBILE ELECTRONIC DEVICE CASE CLIP AND METHOD OF USE

(71) Applicant: Huy Nguyen, Dallas, TX (US)

(72) Inventor: Huy Nguyen, Dallas, TX (US)

(73) Assignee: Huy Nguyen, Dallas, TX (US)

( * ) Notice: Subject to any disclaimer, the term of this patent is extended or adjusted under 35 U.S.C. 154(b) by 0 days.

(21) Appl. No.: 14/710,183

(22) Filed: May 12, 2015

Related U.S. Application Data

(60) Provisional application No. 61/992,688, filed on May 13, 2014.

(51) Int. Cl.
| | |
|---|---|
| *H04M 1/00* | (2006.01) |
| *H04B 1/3888* | (2015.01) |
| *B60R 11/02* | (2006.01) |
| *H04M 1/04* | (2006.01) |
| *H04M 1/18* | (2006.01) |
| *H04M 1/02* | (2006.01) |

(52) U.S. Cl.
CPC ......... *H04B 1/3888* (2013.01); *B60R 11/0241* (2013.01); *H04M 1/04* (2013.01); *H04M 1/0206* (2013.01); *H04M 1/026* (2013.01); *H04M 1/0249* (2013.01); *H04M 1/185* (2013.01)

(58) Field of Classification Search
CPC .. H04M 1/185; H04M 1/0249; H04M 1/026; H04M 1/0206; H04M 1/04; A45C 2011/002; B60R 2011/0059; B60R 11/0241; H04B 1/3888
USPC ................................ 455/575.4–575.9, 575.1
See application file for complete search history.

(56) References Cited

U.S. PATENT DOCUMENTS

| | | | | |
|---|---|---|---|---|
| 5,303,895 | A * | 4/1994 | Hart ....................... | A47G 1/168 248/475.1 |
| 8,636,183 | B1 * | 1/2014 | Steiner .................... | B60R 11/02 224/483 |
| 2004/0069821 | A1 * | 4/2004 | Kobayashi ................ | A45F 5/02 224/269 |

OTHER PUBLICATIONS

Google search: "Car air vent iPhone 4 holder" which sold on 2013, 2 pages.*

* cited by examiner

*Primary Examiner* — Mong-Thuy Tran

(74) *Attorney, Agent, or Firm* — Eldredge Law Firm; Richard Eldredge

(57) ABSTRACT

A mobile phone case for a vehicle vent includes a body forming a cavity and configured to carry the mobile phone therein and a clip pivotally attached to the body and configured to secure the body to the vehicle vent.

8 Claims, 6 Drawing Sheets

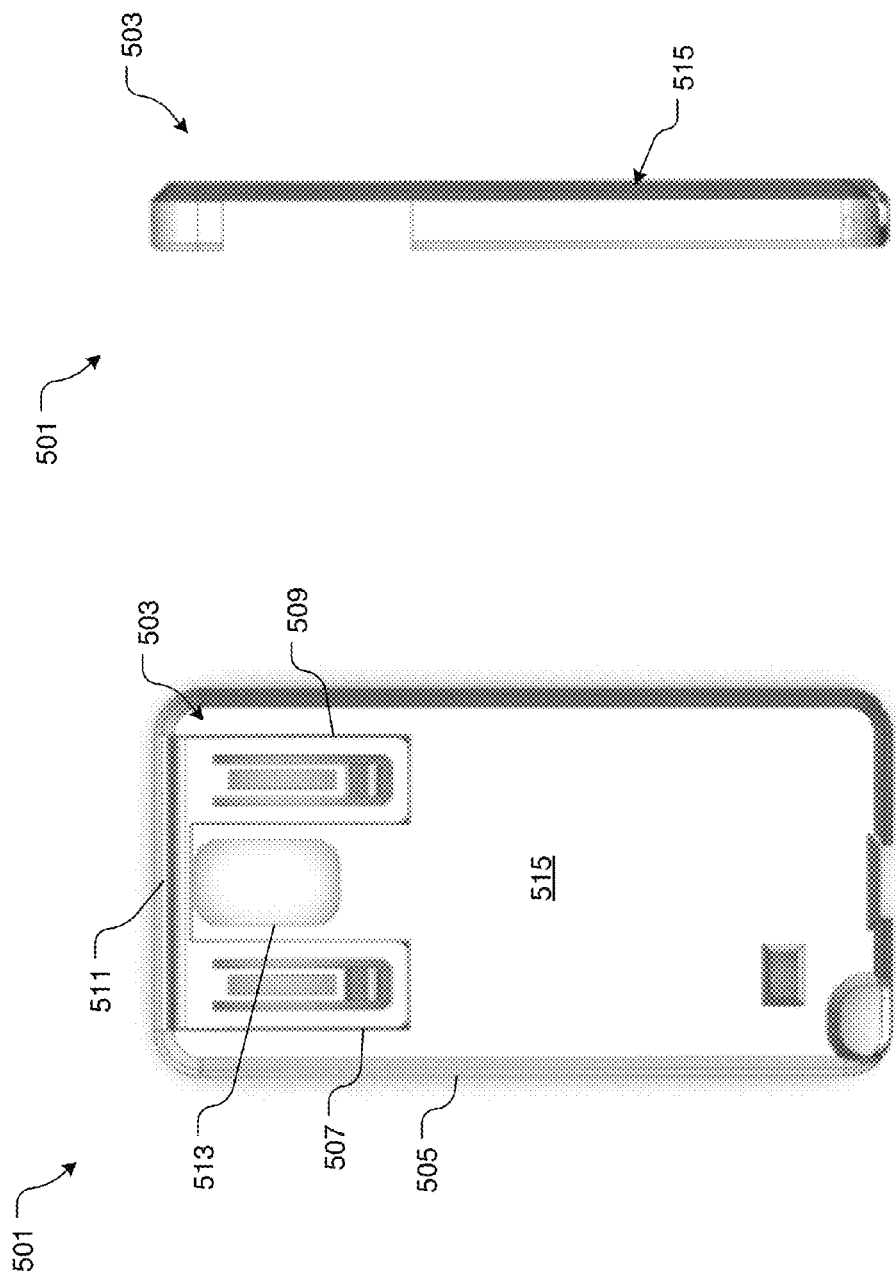

MOBILE ELECTRONIC DEVICE CASE CLIP AND METHOD OF USE

BACKGROUND

1. Field of the Invention

The present disclosure relates to a (e.g., mobile) electronic device protective case with attached clip structure to be used for the mounting of an electronic device, which will securely attach the device to various supporting objects, especially in moving vehicles, so that the mobile device, in a mounted state, can be viewed and operated without the need for any additional equipment or the need of hand-holding.

2. Description of Related Art

Modern day mobile electronic devices frequently allow for applications such as a Global Positioning Protective System or movie/video viewing. In many cases, people want to use such applications without the need to continuously hold on to such devices with their hands. Mobile electronic device users would rather multitask by utilizing their applications while completing other activities which do require hand contact. Several mobile electronic device cases have been invented for all different types of electronic devices and for different purposes. Some mobile electronic device cases are created for the purpose of sturdy protection, while others are intended for aesthetic value. Although various protective cases/covers for mobile electronic devices currently exist, a case which reliably combines the convenience of protection with the ability for hands-free usage as well as other purposes has yet to be developed and released into the market. There remains a considerable need for a device or mechanism which can conveniently position mobile electronic devices in several common areas where users frequently utilize their mobile electronic devices.

Accordingly, although great strides have been made in the area of mobile electronic devices, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 5 is a backview of a case in accordance with a preferred embodiment of the present application;

FIG. 6 is a sideview of the case of FIG. 5;

Figure 1:
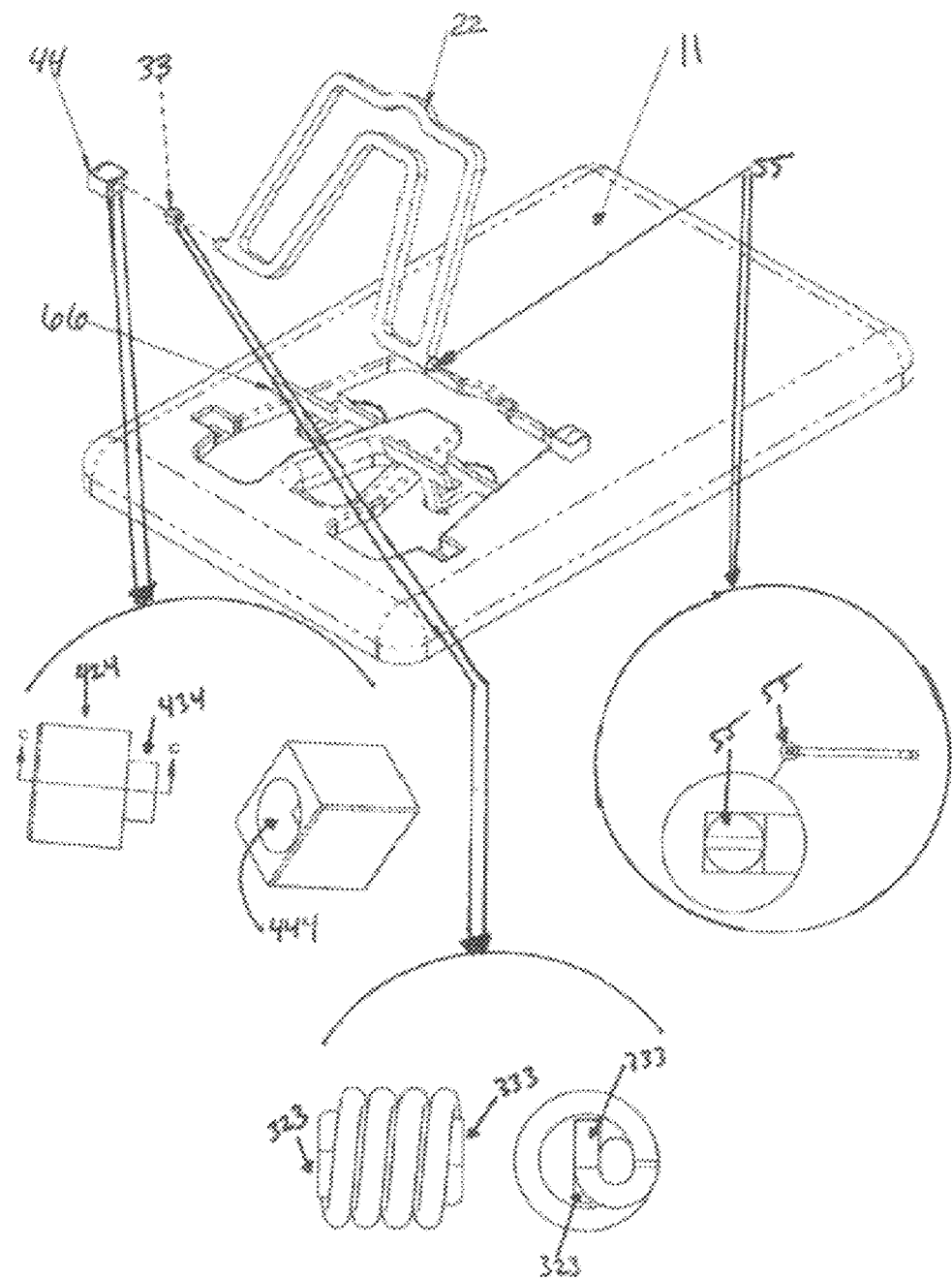
FIG. 1 is a rear view of a case in accordance with a preferred embodiment of the present application, wherein the figure illustrates individual components of the case.

While the protective case and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the protective case and method of use of the present application are provided below. It will of course be appreciated that in the development of any actual embodiment, numerous implementation-specific decisions will be made to achieve the developer's specific goals, such as compliance with protective case-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The protective case and method of use in accordance with the present application overcomes one or more of the above-discussed problems commonly associated with conventional mobile cases. The unique features of the clip and method of use are discussed below and illustrated in the accompanying drawings.

The protective case and method of use will be understood, both as to its structure and operation, from the accompanying drawings, taken in conjunction with the accompanying description. Several embodiments of the protective case are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified view of filtration protective case 11 and method of use in accordance with a preferred embodiment of the present application. It will be appreciated that protective case 11 overcomes one of more of the above-listed problems commonly associated with the conventional mobile cases.

As detailed in FIG. 1, the present disclosure in one embodiment includes a protective case 11, a clip 22, torsion springs 33, spring caps 44, corner flat tabs 55, and t-shaped clip stands 66.

The body of the protective case 11 may be made from a resilient rubber or other (e.g., elastomeric) material which allows for a flexible protective case 11 that surrounds and encompasses all corners of the mobile electronic device, providing such device with consistent and reliable protection. The protective case 11 allows for the full operation and viewing of the entire mobile electronic device screen.

The clip 22 itself may be made from metal or plastic and coated, in one embodiment, with either a plastic or a rubber material to allow flexible, durable, and firm grip to objects. The clip 22, in one embodiment, consists of a larger trapezoid-shaped structure 232 continuously connected to an inner, smaller trapezoid-shaped structure 242 without an extended bottom base, forming two smaller, separate bases 252 for attachment to the protective case 11. Towards the base of both trapezoid structures 232/242, are small horizontal, linear grooves 262 which allow for insertion of the top edge of the clip stands 66. As shown in FIG. 1, with a left corner view from the top back of the protective case 11, the clip 22 is located at the top of the protective case in a reverse trapezoid position with its two bases 252 positioned at the far top of the protective case.

As shown in the embodiment of FIG. 1, each clip base 252 incorporates a small, flat tab 55 protruding from the outer side of each clip base 252 on the larger trapezoid structure 232. The flat tab 55 consists of a singular line slit or indentation which allows for connection of the flat tab 55 with one end of the torsion spring 33.

The separate bases 252 of the clip 22 are securely attached to the top, back of the protective case 11 using two torsion springs 33 on each clip base 252. Each spring consists of an unbroken line coiled in a horizontal direction, until one end of the coiled line stops in an upward, vertical position 333 and the opposite end of the line finishes in a vertical, downward position 323.

Each torsion spring 33 located on opposing sides of the larger trapezoid structure 232 is enclosed in a spring cap 44. Each spring cap 44 is made of a plastic material, and each cap is formed from what appears to be two rectangular-shaped boxes. Each spring cap 44 includes a larger, rectangular-shaped box wherein one side of the box 424 contains a circular opening 444, allowing for one end of the torsion spring 323/333 to be inserted into the linear slit 55. The small end 434 of the spring cap will fit firmly into the designated indentation of another flat tab 55 which is located in the small end of the spring cap.

The clip 22 may be propped as a kickstand with the use of two t-shaped clip stands 66. Each stand 66 may be made from a plastic material and shaped into a t-shape design with one elongated side of the "T" 626 directed towards the middle of the protective case. Each stand consists of two round pegs 636 located on each side of the bottom of the stand and is used to lock each stand to the protective case 11. The base of each stand 66, in one embodiment, includes two pegs 636 which are inserted into the inner side rim of the indented area of the protective case 11.

According to the above arrangement, in order to securely attach the clip 22 to the protective case 11, the vertical portion of one end 323/333 of the torsion spring 33 is firmly inserted into the linear indention of the flat tab 55 while the opposite vertical end 323/333 of the torsion spring 33 firmly inserted into the linear indention of a second flat tab 55 inside the spring cap 44. Such arrangement is positioned on each side of the clip 22, allowing the clip 22 to be securely locked into the protective case from both ends of the clip 22.

Figure 2:
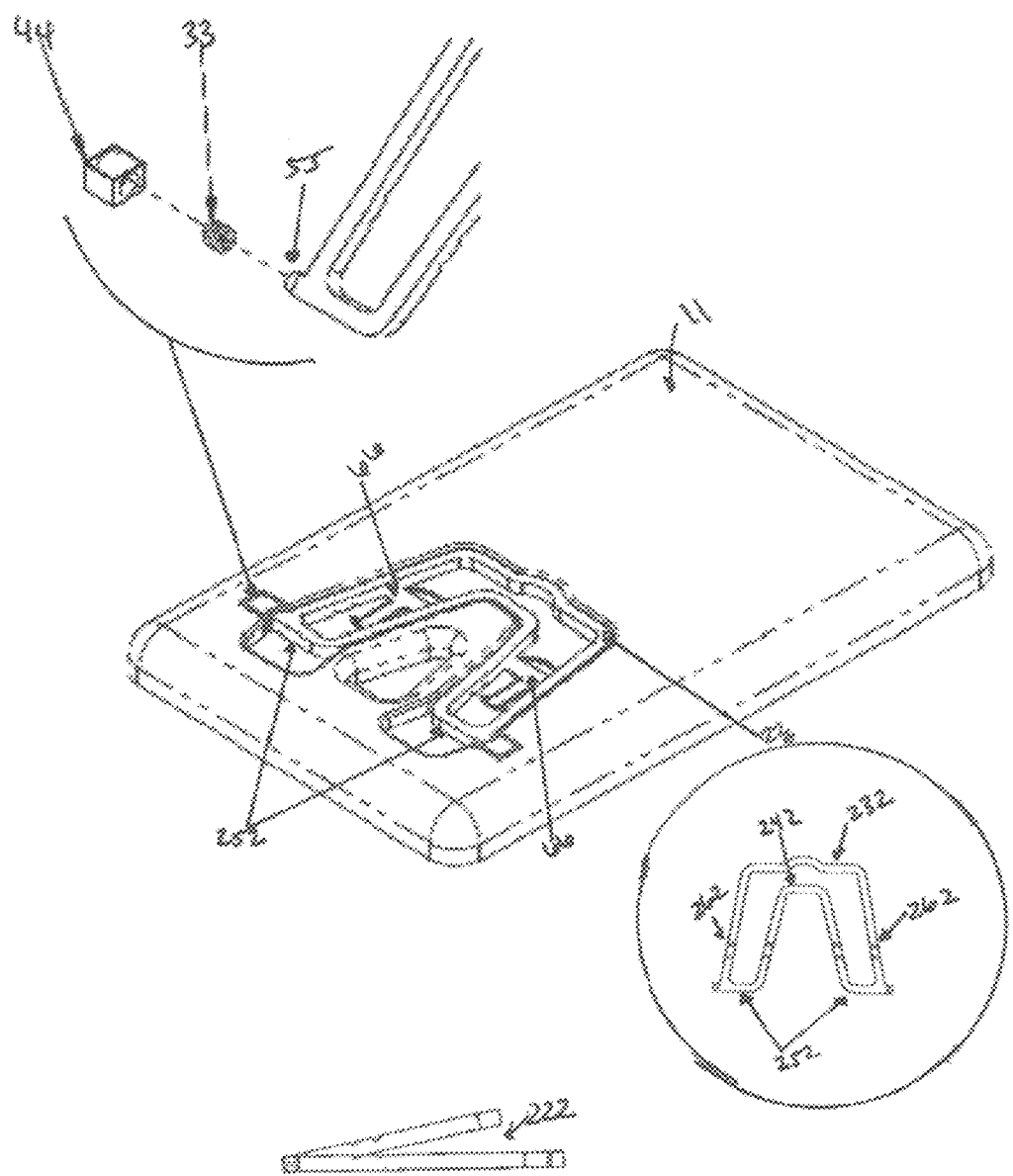
FIG. 2 is a rear, top-to-bottom, view of the case of FIG. 1 with the electronic mobile device laying flat with the screen faced down and the clip mechanism in its closed position.

As shown in the embodiment of FIG. 2, the clip 22 lays flat in the indention of the protective case 11 in a closed position, showing flush protective case 11. Each clip stand 66 is laying flat in its bed, securely beneath the right and left side of the clip 22 in the closed position allowing for a flush surface. In its closed position, the clip 22 is positioned with its two separate bases 252 pointed towards the top of the mobile electronic device. Both larger structure 232 and smaller trapezoid-shaped structure 242 may be separated in opposite, vertical directions, forming a central engagement member 222 for insertion of the slats of a conventional air conditioning vent in an automobile or any other accommodating object.

Figure 3:
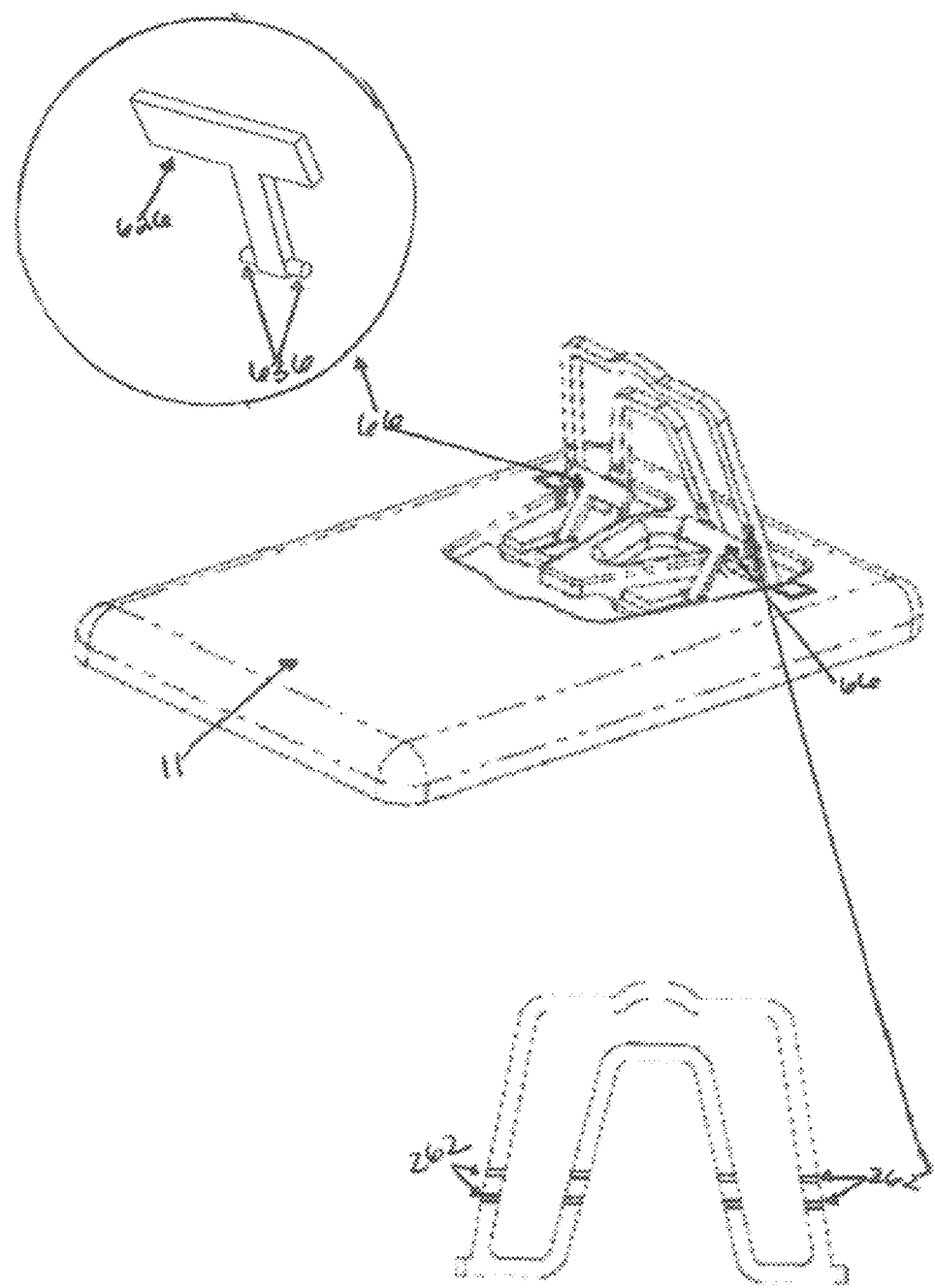
FIG. 3 is a rear, bottom-to-top, view of the case of FIG. 1 shown with the stands inserted into the clip mechanism forming a kickstand.

As shown in the embodiment of FIG. 3, the clip 22 may be disengaged from a closed position on the protective case 11 and extended upward and away from its indented bed on the mobile electronic device to an opened, slanted position. Each clip stand 66 is originally located in an embedded position directly beneath the right and left side of the clip 22. As shown in FIG. 3, each stand may be lifted from its down position and securely inserted into the horizontal, linear grooves 262 located near the bottom, backside of the clip 22. Each t-shape stand 66 located on each side of the clip is sufficiently rigid and resilient to support the weight of the mobile electronic device. When applying both clip stands 66, a kickstand will be formed to allow for the mobile electronic device to be utilized while propped in an approximately 45 degree angle from a flat surface, permitting an easy, hands-free viewing and operation.

Figure 4:
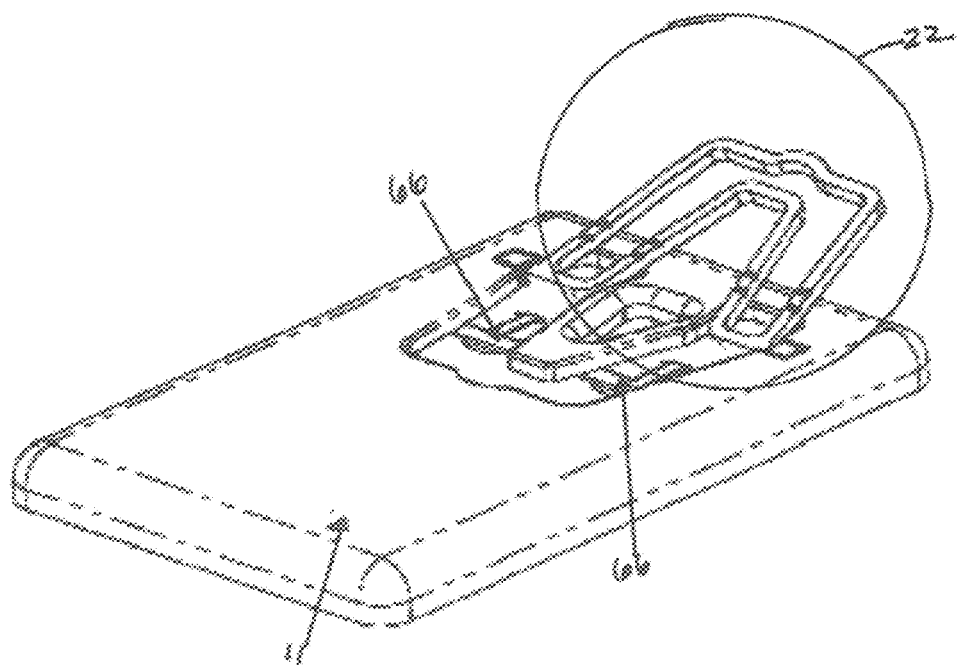
FIG. 4 is a rear, bottom-to-top, view of the case of FIG. 1 that shows the clip mechanism extended upward to a vertically hanging position.

As shown in the embodiment of FIG. 4, the clip 22 may be extended from its closed position on the protective case 12 and extended from the back of the mobile electronic device in a vertical or upward direction. As shown in FIG. 4, the clip 22 may be extended in an approximately 180 degrees vertical direction. The clip 22 may be disengaged from a closed position to an opened position, allowing for the mobile electronic device to be self-hanging in an upright position from any wall nail or accommodating object by use of the vertically extended clip 22. In its opened position, the resiliently flexible nature of the clip mechanism 22 also allows for the hands-free operation and viewing of the mobile electronic device in an automobile. As shown in FIG. 4, when set in its opened position, the clip 22 allows for the mobile electronic device to be suspended from an automobile air conditioning vent or any accommodating object in an upright position for hands-free viewing and operation.

The MEDCC may be used to attach any mobile electronic device to the inside of any motor vehicle for easy viewing and operating without holding it. Specifically, the MEDCC, which is attached to a mobile electronic device, will flip out and fit firmly into the air conditioning vent of a motor vehicle. Once attached, the MEDCC user may operate and view his/her mobile phone screen as a navigation system that will direct the driver to his/her intended destination without the need for the driver to hold the mobile phone device with his/her hands. With the use of the MEDCC, the driver may view and operate his mobile device without compromising his driving by taking his hands off of the wheel and potentially putting himself and others in harm's way.

Referring now to FIGS. 5-8 in the drawings, various views of a mobile phone case 501 is shown in accordance with a preferred embodiment of the present application. It will be appreciated that case 501 could incorporate one or more of the features discussed above, and vice-versa.

In the contemplated embodiment, case 501 is configured to secure a mobile phone to a vent of a vehicle (not shown). To achieve this features, case 501 includes a body 505 that forms a cavity 701 with a sidewall 703 configured to surround the periphery of the phone and a clip 503 configured to secure the body 505 to the vehicle vent.

Figure 7:
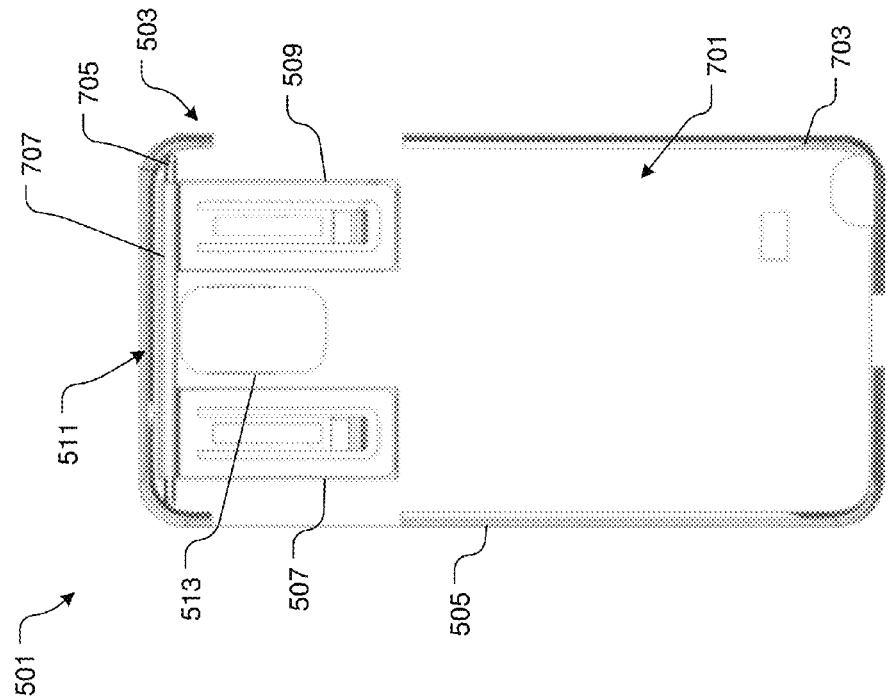
FIG. 7 is a front view of the case of FIG. 5.

In the preferred embodiment, the clip 503 is configured to pivotally attach to body 505 via a pivot joint 511. As depicted in FIGS. 5 and 6, the pivot joint 511 is integrally attached to two arms 507, 509 and configured to swing the arms in extended (not shown) and folded positions, e.g., see FIG. 6. When in the folded position, the arms 507, 509 remain flush with the outer surface 515 of body 505. It will be appreciated that joint 511 could be spring loaded to retain the arms 507, 509 in the folded position during non-use. As shown in FIG. 7, joint 511 is configured to extend within the cavity 701 and includes a rod 705 that is rotatably received within a channel 707. It will be appreciated that one or more springs (not shown) could be disposed within the channel 707 and configured to spring load the arms in the folded position. Alternative fastening devices could be used, for example, magnets, clips, claps, and the like, in lieu of the contemplated spring-loaded embodiment.

During use, the arms 507, 509 are configured to engage with the vent of the vehicle and are sufficiently sized to allow the body remain in the secured position during use. As shown in FIG. 5, the arms 507, 509 and joint 511 are spaced apart in a U-shaped fashion so as to avoid interference with opening 513, e.g., a camera lens opening.

Figure 8:
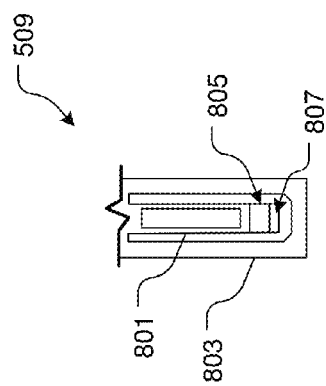
FIG. 8 is a front view of a clip arm of the case of FIG. 8.

Referring now to FIG. 8 in the drawings, a front view of arm 509 is shown having an inner member 801 peripherally surrounded by an outer member 803. It will be appreciated that inner member 801 could be movably attached to outer member 803 to facilitate better attachment to the vehicle vent.

In the contemplated embodiment, inner member 801 includes a surface area 805 that offset inwardly from outer surface 807 of member 801. The inward surface area 805 facilitates a more efficient attachment between the arm and the vehicle vent.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A self-hanging protective case for use with a mobile electronic device, comprising of:
   a body configured to receive the mobile electronic device and configured to provide viewing access of a screen of the device; and
   a multi-function clip secured to the body, the multi-function clip having:
      a larger inverted trapezoid-shape structure;
      a smaller trapezoid-shape structure disposed within the larger structure;
   wherein the clip is configured to be extended up to a 180-degrees longitudinal direction relative to the body;
   wherein the clip is set in a concave area on an upper area of the back of the protective case;
   wherein the concave are beneath the clip of the protective case incorporates a clip stands which prop mobile electronic device upward in an angled position; and
   wherein the clip stand is locked into the protective case, the clip stand having a top edge being inserted into a horizontal groove of a bottom side of clip.

2. The self-hanging protective case of claim 1, wherein the clip is secured to a first and second corner of the concave area of the protective case by a torsion spring positioned on a first and a second side of the clip.

3. The self-hanging protective case of claim 2, wherein the torsion spring is comprised of a flexible steel or plastic material, the torsion spring shape, and one side of the spring is securely attached to the clip, and opposite side of the spring is securely attached to perimeter of the concave area of the protective case.

4. The self-hanging protective case of claim 2, wherein the torsion springs is housed by a rectangular, plastic structure.

5. The self-hanging protective case of claim 1, wherein the clip extends in upward direction up to 180 degrees, which in turn enables the mobile electronic device to be securely hung in a vertical, upright position.

6. The self-hanging protective case of claim 1, wherein the clip is formed by two inverted trapezoid-shaped structures, the trapezoid-shaped structure including one smaller trapezoid-shaped structure surrounded by one larger trapezoid-shaped structure.

7. The self-hanging protective case of claim 6, wherein the clip is coated with plastic or rubber material and having inverted trapezoid-shape structure to allow for clip to be affixed and/or suspended to various objects that allow for clipping of the trapezoid structure.

8. The self-hanging protective case of claim 1, wherein the clip is embedded in concave area of protective case, exposing a flush surface on the back of said protective case.

* * * * *